United States Patent
Bowlin

[19]

[11] Patent Number: 6,107,370
[45] Date of Patent: Aug. 22, 2000

[54] SINGLE PACK SILICONIZED EPOXY COATING

[75] Inventor: John R. Bowlin, Houston, Tex.

[73] Assignee: Aegis Coating Technologies, Houston, Tex.

[21] Appl. No.: 09/225,097

[22] Filed: Jan. 4, 1999

[51] Int. Cl.[7] .............................. C08K 5/315; C08L 63/02
[52] U.S. Cl. .......................... 523/461; 525/487; 525/523; 528/121
[58] Field of Search .............................. 523/461; 525/487, 525/523; 528/121

[56] References Cited

U.S. PATENT DOCUMENTS 4,202,811  5/1980  Michael et al. .
4,294,746  10/1981  Blair et al. .............................. 525/107
4,609,692  9/1986  Huybrechts et al. .
4,859,722  8/1989  Shiobara et al. .
5,691,401  11/1997  Morita et al. .
5,760,103  6/1998  Wentzell .

*Primary Examiner*—Robert Dawson
*Assistant Examiner*—D. Aylward
*Attorney, Agent, or Firm*—Karen B. Tripp; Elizabeth R. Hall

[57] ABSTRACT

A single pack siliconized epoxy coating has been discovered that requires neither heat nor mixing with a catalytic curing agent immediately prior to application. The coating is comprised of an epoxy resin, a silanol based polydimethylsiloxane, an amine functional silicone polymer, and a distilled fatty nitrile. After homogenous blending of the compound, the composition is stored in air tight containers with a shelf life of over two years.

16 Claims, No Drawings

SINGLE PACK SILICONIZED EPOXY COATING

FIELD OF THE INVENTION

The present invention relates generally to epoxy coatings, paints and lining/barrier coat systems and more specifically to epoxy coatings and paints that are: (1) water-based; (2) VOC compliant; (3) one pack ("single component") systems; (4) non U.V. reactive; (5) non-chalking; (6) corrosion, humidity and salt fog resistant; (7) elastomeric and highly flexible; (8) highly resistant to acids, caustics, fuels, and solvents; (9) self priming; and that have (10) high gloss retention capabilities; and (11) virtually no pot life limitations.

BACKGROUND OF THE INVENTION

In the past, epoxy products were predominantly solvent based, comprised of two parts or "components," and commonly called two pack solvents. Such two pack solvents were typically comprised of a part A and a part B. Part A was either a pure resin (typically the diglycidyl ether of bisphenol A or bisphenol F) or a modified epoxy resin (in combination with other polymers or functional fluids), in solid form or in solution, with a variety of solvent diluents/carriers such as xylene, acetone, MEK, MIBK, and toluene. Part B was a curing agent catalyst—2,4,6 tri-(dimethylaminomethyl) phenol, triethylene-tetramine, dimethyl amino propylamine, dimethyl amino methyl phenol, methylene-dianiline, diethylene triamine—generally known as polyamides, polyamidoamine, anhydrides and tertiary amines.

During the 1980's and 1990's, regulatory requirements pertaining to VOC's caused many developments to be made in waterborne epoxy resin technology. Currently in the marketplace both the traditional two component solvent based products and numerous waterborne epoxy systems are available.

These prior art products have suffered a number of drawbacks and deficiencies. For example, epoxy coatings and paints currently available are typically multiple component or multi-part type products that need to be mixed prior to use. The ratios of components or parts A to B in such mixtures can vary significantly based on the specifics concerning intended use: that is, (a) the condition of the surface to be coated; (b) the number of coats to be applied; (c) the desired final performance characteristics of the coating; and (d) the type of service (i.e., marine environment versus chemical containment, etc.). Also, the usable pot life of known epoxy coatings and paints is typically very limited. That is, when components or parts A and B are mixed there is a limited amount of time in which the paint or coating can be used before the mixture becomes catalyzed or reacted to the point that it is no longer useable. The pot life for such mixtures can vary from a few minutes up to about eleven or twelve hours, resulting in a high percentage of material loss due to work scheduling. Still other drawbacks or deficiencies of known epoxy coatings and paints are their typical characteristics ofbeing very photochemically reactive, leaching color, fading, and developing a surface chalking in a relatively short time after exposure to ultraviolet light (U.V.). Known epoxies and modified epoxy coatings and paints are also generally considered brittle or "non-elastomeric" in nature, even though some are marketed as "flexible," based on elongation rates of 10–15% when compared to rigid films.

SUMMARY OF THE INVENTION

The foregoing drawbacks and deficiencies of the prior art have been addressed in the present invention. More specifically, epoxy coatings/paint systems of the present invention have: (a) a high degree of performance in terms of resistance to acid, alkalis, chemicals, solvents, and fuels; (b) exceptional weathering capabilities (colorfast, nonchalking, and salt fog and humidity resistance); (c) encapsulation, corrosion control and antifouling capabilities; and (d) a high degree of elasticity, flexibility and impact resistance. The epoxy coatings/paint systems of the present invention do not require mixing of multiple parts or components prior to use and eliminate or reduce the need for primer and immediate coats. The systems of the invention also have a greatly extended usable pot life, which eliminates or substantially reduces product loss due to work scheduling. Further, the systems of the present invention are water-based and are believed safer for the environment and humans than epoxy systems commonly in use.

The present invention provides these advantages through a unique composition. This composition is prepared by mixing or blending pure and/or modified bisphenol A or F water reducible epoxy resins, or combinations thereof, with silanol oil derived amine functional silicone polymers and polydimethylsiloxane fluids as a millbase. To this millbase is added an oleylnitrile or fatty nitrile. Specific polymers may be added to modify the millbase further for particular applications or uses. A standard system modifier is a non-hazardous ethylene blocked copolymer. However, the range of potential polymer modifiers is extensive, provided the modifier has a hydroxyl, epoxy, amine, silanol, methoxy and/or hydride functionality. An emulsifier may be added if needed before adding the modifier.

In preparing this composition, each ingredient should preferably be added separately, followed by or preferably with continuous blending, to obtain a homogeneous composition. The preparation should be at temperatures less than about 100° F. and relative humidity levels about 80% or higher. When blending is complete, the composition should be stored in air tight containers.

In use, the composition may be readily applied to a surface directly from the container. Mixing with a curing agent or applying heat to activate a curing agent is not needed.

DETAILED DESCRIPTION OF THE PREFERRED EMBODIMENT

Compositions of this invention have wide applications as coatings on a multitude of surfaces for many protective purposes. Particular advantages may be realized by use of the compositions of this invention as commercial, industrial and marine barrier coatings. For example, compositions of the invention are well suited for coating industrial plant or factory floors, particularly where heavy machinery is operating, and for coating surfaces of facilities where moderately hazardous chemicals, acids, caustics, fuels, or solvents are stored or processed. The exact contents of the compositions of this invention will vary depending on the intended use and the functional/performance requirements for the compositions. However, certain compounds must be present.

The base compound or ingredient of the composition is an epoxy resin, such as "EPON® resin 828" manufactured by Shell Chemical Company, Houston, Tex., "Dow D.E.R. 331" manufactured by Dow Chemical Companies, Midland, Mich., or "Araldite 6010" manufactured by CIBA Speciality Chemicals Corp., Brewster, N.Y., comprising about 30–70 wt. % of the composition. These examples of unmodified liquid epoxy resins are based on diglycidyl ether of bisphenol A and epichlorohydrin. The EEW (epoxide equivalent weight) ranges should preferably be between about 178–200, and most preferably between about 188–190. The epoxy resin should be nonvolatile and have a viscosity ranging between about 10000–14000 cP, and preferably about 12,000 cP. These examples are appropriate for cold or heat cured systems and are general purpose type resins. For applications where increased or ultra high chemical resistance is needed, a lower net amount of a higher molecular weight bisphenol A resin or a bisphenol F resin may be used. For example, 35 wt. % bisphenol A resin or 30 wt. % bisphenol resin might be used.

To the epoxy resin is added silanol based polydimethylsiloxane, particularly "SM2112" manufactured by General Electric Silicones Co., Waterford, N.Y. or "DC 108" manufactured by Dow Corning Corporation, Midland, Mich., preferably in an amount of about 5–7 wt. %. However, for intended uses of the composition requiring a high viscosity liquid phase system, the functional siloxane content should preferably be about 7 wt. %. For intended uses requiring increased or ultra high chemical resistance, the level of polydimethylsiloxane should preferably be reduced to about 2 to 3 wt. % and should be combined with an amine functional silicone polymer.

The silanol based polydimethylsiloxane is believed to function as an elastomeric film former and binder when combined with epoxy resin due to its crosslinking capability.

"SM 2112" is the preferred silicone emulsion for use in the composition of this invention when the composition is intended for use as an industrial barrier coating for plant floors and containment systems. "SM 2112" is cationic in nature and is commonly used in textile treatments and personal care products. Its general structure and functionality are discussed in U.S. Pat. No. 4,661,577. The emulsion of "SM 2112" has been found to be particularly stable when in contact with (1) various acidic materials that otherwise tend to deactivate silicone emulsions, and (2) components that contain hydroxy (—OH) groups.

To increase the coating's film strength and resiliency to higher alcohols and solvents, amine functional silicone polymer(s), particularly "SM 2059" manufactured by General Electric Silicone Co., Waterford, N.Y. or "DC 929" manufactured by Dow Corning Corp., Midland, Mich., may be added. This polymer contains about 50% silicone. The general structure and functionality of "SM 2059" are discussed in U.S. Pat. No. 4,600,436. This polymer is a cationic emulsion of an amine functional silicone polymer. This system has an exceptional stability profile when in contact with (1) various acidic materials that otherwise tend to deactivate emulsions of an amine functional silicone polymer, and (2) components that contain hydroxy (-OH) groups which can otherwise destabilize such emulsions and gelatinize certain other components. If used at all, the preferred amount of "SM 2059" is about 3–6 wt. % and alternatively, the preferred amount of "DC 929" is 12–14 wt. %. Flexibility and elongation capability of the cured coating will diminish as the percentage of amine functional silicone polymer increases.

An emulsifier is not needed for compatibility or proper mixing of the specific components of "SM 2112" and "EPON® resin 828" cited in the example above. However, for some other compositions of the invention for other uses, various types of modifiers and extenders may be added to adjust for coating thickness, hardness, and resistance to particular solvents or chemicals. Appropriate modifiers and extenders are highly varied and include, but are not limited to, the following or combinations thereof: Teflon, ceramics, ABS, PVC, polyester glass, chlorinated polyether, polycarbonate, phenolic resins, non-styrenated acrylic resins, and a plethora of minerals such as alumina trihydrate, barytes, calcium carbonate clay, mica, nepheline syenite silica, wollastonite. Preferred emulsifiers are: "XH," "XH," "D -683," "TMN" and "Min-Foam 1X" & "2X," all manufactured by Union Carbide Company. When added, emulsifiers preferably comprise less than or equal to about 1 wt. % of the composition.

The composition of the invention further comprises about 3–8% wt. % of a fatty nitrile. The exact amount of fatty nitrile to be used in the composition depends on the desired degree of flexibility/elongation needed for a particular application and on the following composition criteria: base epoxy resin type(s), EEW and percentage, type and quantity of modifier(s), overall solids level and final product viscosity requirements.

The preferred fatty nitrile is 9-octadecenenitrile, oleonitrile, although any distilled fatty nitrile, or fatty alkyl nitrile, or fatty acid at the stage of being distilled to the point that it is ready for re-hydrogenation to further obtain primary, secondary or tertiary amines, will work, be it from oleyl, or tallow, tall oil, soy or cocoa, or other fatty acid source. Those skilled in the art will readily appreciate that use of different fatty acids will require adjustments in the amounts and possibly purity of the other components of the composition.

The preferred fatty nitrile may be purchased from Akzo Nobel, but any other manufacturers, such as Lonza or Witco, who use fatty nitrites as a raw material or precursor to primary, secondary or tertiary amine products may have a suitable fatty nitrile for use in this invention.

The 9-octadecenenitrile, oleonitrile (or other fatty acid nitrile) is believed key to the function of the composition of the invention. Ammonium salts of 9-octadecenoic acid (or other fatty acid) act as a buffer/stabilizer-surfactant in formulating and storage of the composition. This buffering and stabilizing is believed to be due to the presence of 9-octadecenoic acid, ammonium salts, and 9-octadecenamide. The secondary function of the 9-octadecenitrile is as an extender and plasticiser, evident in the crosslinking and cured phases respectively. As the composition is exposed to air and/or heat, as happens when the coating is applied to a desired surface, loss of the 9-octadecenoic acid and 9-octadecenoic acid ammonium salts (due to hydrolysis caused by the oxygen in the air) is believed to initiate a catalization process causing an unbalanced state in the presence of 9-octadecenamide and the amine functional silicone polymer. This incompatibility is believed to promote the classical reaction between the epoxide group in the resin and an active hydrogen on the amine group. Elastomeric qualities are believed to be imparted through the double bond capabilities of the oleylnitrile in conjunction with the blend of amine functional silicone polymers and polydimethylsiloxane fluids. The composition is thereby able to be self curing, i.e., no curing agent need be added upon application.

The stoichiometric ratios work according to the same principles as applicable to standard two component epoxy resin systems except that the ratios may vary based on the EEW (epoxide equivalent weight) of the epoxy resin, the type and quantity of amine functional silicone polymer used, and the type of service modifier used.

Preferably, after all of the above discussed components have been blended or mixed to comprise the composition of the invention, polymer and/or mineral modifiers may be added. Such modifiers may comprise about 3–40 weight percent of the composition. For example, modifiers comprising ethylene blocked acrylic polymer may comprise 35 wt. %, a phenolic resin may comprise 2 wt. % and a silica alumina ceramic may comprise 26–52 gr./liter. This particular modifier mixture in the composition provides a moderate hardness yet flexible, general purpose, floor coating epoxy, resistant to oils, grease, most commercial solvents, acids and caustic materials. It will also be crack resistant due to impact.

Suitable potential modifiers for the invention are numerous, based on qualities desired for particular applications of the invention (i.e., as floor coatings, industrial metal coatings, marine coatings, etc.)—qualities such as types of resistance, load factors, hardness, flexibility or elongation needs of the cured composition product. Other examples of modifiers include, without limitation, Teflon® manufactured by E. I. DuPont Fluoro Products, Wilmington, Delaware, ceramics, ABS, PVC, polyester glass, chlorinated polyether, polycarbonate, phenolic resins, non-styrenated acrylic resins, and a plethora of minerals, such alumina trihydrate, barytes, calcium carbonate clay, mica, nepheline syenite silica, and wollastonite.

Antifoam additives or wetting agents may be needed to incorporate certain modifiers, particularly those with very high solids levels. Such additives typically and preferably comprise less than 1 wt. % of the composition. The example for the floor coating above does not require an antifoam additive or wetting agent.

Other optional additives to the composition are coalescing agents, drying agents and Theological additives. Examples of coalescing agents, which can be used alone or in combination, are: "Dowanol PnB," "EB," "DpnB," "DB," and "DE acetate," all manufactured by Dow Chemical Company. Other companies may have suitable equivalents. Examples of effective drying agents are "Nocure" and "Drymax," manufactured by Condea Servo LLC., Piscataway, N.J. "Dowanol EB" or equivalent "Nocure" were used in the example industrial barrier coating above. Preferably, coalescing and drying agents will comprise less than about 15 weight % of the composition and typically will range between about 7–15 wt. %. Winter and summer formulations may vary somewhat due to drying conditions.

Rheological additives, if any, should preferably comprise less than about 1.5 wt. % and may typically range between 0.25 and 0.5 wt. % of the composition, if present at all. Examples of rheological additives are "SER-AD FX" series, manufactured by Condea Servo LLC. and "Aqualon Natrosol 250 plus." These materials are used for packaging stability and certain other application properties. Rheological additives are typically non-associative thickeners for preventing sag when the composition is applied to vertical surfaces. They may or may not be needed based on the type of modifier used and the level of total solids in the composition.

In preparing the composition of the invention, the components are preferably added together in the order shown in Table I below. Preferably, mixing or blending occurs continually during addition of each compound or component.

TABLE I

| Component | Wt % Min | Wt % Max | Median Wt % | Mix Sequence |
|---|---|---|---|---|
| Bisphenol A epoxy resin (pure or modified) OR | 30 | 70 | 40–50% | 1 |
| Bisphenol F epoxy resin (pure or modified) OR | 30 | 70 | 40–50 | 1 |
| Combined bisphenol A & F (pure or modified) | 35 | 65 | 47–55% | 1 |
| Silanol based polydimethylsiloxane | 2 | 7 | 2.5–7.0 | 2 |
| Amine functional silicone polymer | 3 | 6 | 4–6.0 | 3 |
| Emulsifier (optional) | 0 | 0 | 0.5% | 4 |
| Oleylnitrile, distilled | 3 | 8 | 5–7.5 | 5 |
| Standard or service specific modifier | 3 | 40 | 20–35 | 6 |
| Antifoam additive (optional) | 0 | 0 | <0.25% | 7 |
| Coalescing agent (optional) | 7 | 15 | 11–12 | 8 |
| Rheological additive (optional) | 0.25 | 1.5 | 0.25–0.5% | 9 |

A moderate shear rate should preferably be used in mixing the components to comprise the composition. This rate can be obtained with a high volume rotary mixer. The speed of mixing should be maintained fairly low throughout the addition of ingredients 1, 2, 3, 4, and 5 beginning at 600 RPM's initially and increasing to 1200–1300 gradually. As ingredients 6, 7, 8, and 9 are added the rate of mixing should be increased to between 2200 and 2400 RPM's. The time required to ensure a homogeneous mixture is typically between about 45–60 minutes. Any colorants to be added should preferably be added after the other components have been throughly blended.

Ambient temperature and humidity levels should preferably remain stable throughout the manufacturing process. Temperature should preferably be kept below 100° F and relative humidity levels should be about 80% or greater.

Upon completion of the blending and quality control process the composition is preferably stored in air tight containers to prevent contamination or degradation of the product. Storage conditions should preferably be dry, out of direct sunlight, with temperature levels maintained at less than 120° F. The composition has at least a two year shelf life under these storage conditions.

Typically, the coating compositions of the invention are used as follows. First, the composition is provided in a single container, either nonpigmented or pigmented to a standard color or to the color of choice required by the customer. The composition may be applied, for example, to a surface by brush, roller, squeegee or by conventional air assisted spray system. At any time the application can be stopped and the equipment can be cleaned with fresh water and denatured alcohol to remove the uncured invention. Once the invention is cured to a tack free stage, further cleaning will necessitate methylene chloride or EEP (ethyl 3-ethoxypropionate) solvent.

Further examples of compositions of this invention are shown in Table II.

TABLE II

| | Examples | | |
|---|---|---|---|
| Formulations | Example 1 | Example 2 | Example 3 |
| Bisphenol A epoxy resin (pure or modified) | 37 | 0 | 3 |

TABLE II-continued

| Formulations | Example 1 | Example 2 | Example 3 |
|---|---|---|---|
| Bisphenol F epoxy resin (pure or modified) | 0 | 0 | 50 |
| Combined Bisphenol A & F (pure or modified) | 0 | 60 | 0 |
| Silanol based polydimethylsiloxane | 3 | 2 | 2 |
| Amine functional silicone polymer | 5 | 6 | 4 |
| Emulsifier (optional) | <0.5 | 0 | <0–.5 |
| Oleylnitrile, distilled | 7 | 8 | 8 |
| Standard modifier (ethylene blocked copolymer) | 35 | 0 | 0 |
| Specific modifier | 26 gr/l | 9 | 22 |
| Antifoam additive (optional) | 0 | 0 | 0 |
| Coalescing agent (optional) | 12.25 | 15 | 13 |
| Rheological additive (optional) | 0.25 | 0 | 0.5 |

All figures in Table II are in weight percent except as otherwise noted.

The Example 1 composition has been used in a test application as a metal coating for aluminum 40 foot utility trailers. A U.V. stable, flexible, abrasion-resistant non-stick coating for preventing dehydrated microbe sludge was desired. The surface preparation involved was a light sand-blasting only. The Example 1 composition was applied directly to the metal (without primers) in two light coats yielding a dry film thickness of about 6 mils. The test units were monitored on a quarterly basis for about a year and the coating appeared to meet the desired characteristics.

The composition of Example 2 was developed and tested as a marine coating with anti-fouling properties. The composition was applied directly to one side of a metal panel in two coats yielding about an 8 mil dry film thickness. The other side of the test panel was coated with a competitive anti-fouling marine paint for comparison. The test panel was attached to and submerged on a static anchor line attached to an offshore structure in Galveston bay. After about one year, the side coated with the Example 2 composition had no signs of marine life (barnacles) attached whereas the competitive product had allowed marine life to attach.

The composition of Example 3 was used in a test application as a heavy duty plant floor and chemical containment coating. This application was applied to a concrete slab and spill containment wall in a chemical processing plant. A U.V. stable, abrasion and highly chemical resistant coating was desired. The coating also needed to be resistant to pure hydrochloric acid as well as mono and dichlorinated phenol. The plant floor was subjected to piping and pump leaks on a continual basis. After about one year, the coating appeared to meet the desired characteristics. The chemicals had not even affected the gloss level of the coating.

While the invention will be described in connection with certain preferred embodiments, it is not intended that the invention be limited to those embodiments but rather that it be accorded the full spirit and broadest scope allowed by the prior art and commensurate with the following claims.

I claim:

1. A coating composition comprising:

an epoxy resin, a silanol based polydimethylsiloxane, an amine functional silicone polymer, and a distilled fatty nitrile.

2. The composition of claim 1 further comprising a modifier.

3. The composition of claim 1 further comprising an emulsifier.

4. The composition of claim 1 further comprising an antifoam additive.

5. The composition of claim 1 further comprising a coalescing agent.

6. The composition of claim 1 further comprising a rheological additive.

7. The composition of claim 1 further comprising a drying agent.

8. The composition of claim 1 wherein said fatty nitrile is selected from the group comprising fatty nitrites, fatty alkyl nitrites or fatty acids at the stage of being distilled to the point of readiness for re-hydrogenation.

9. The composition of claim 8 wherein said fatty nitrile is from oleyl, tallow, tall oil, soy or cocoa.

10. The composition of claim 9 wherein said fatty nitrile is 9-octadecenenitrile.

11. The composition of claim 1 wherein said resin comprises about 30 to 70 weight percent of the composition.

12. The composition of claim 8 wherein said fatty nitrile comprises about three to eight weight percent of the composition.

13. The composition of claim 12 wherein said epoxy resin is comprised of a bisphenol A epoxy resin, or a bisphenol F epoxy resin, or a combination of bisphenol A and bisphenol F epoxy resin, ranging from about 30 to about 70 weight percent of said composition.

14. A method for manufacturing an epoxy coating comprising:

about 30 to 70 weight percent bisphenol A or bisphenol F epoxy resin or a combination of bisphenol A and bisphenol F epoxy resin;

about 2 to 7 weight percent silanol based polydimethylsiloxane;

about 3 to 6 weight percent amine functional silicon polymer; and about 3 to 8 weight percent fatty nitrile; wherein said individual components of said coating are blended under conditions of at least about 80% relative humidity and less than about 100° F.

15. The method of claim 14 wherein said individual components of said coating are added to said epoxy resin individually during continuous blending.

16. The method of claim 15 further comprising storing said coating after blending in an airtight container.

* * * * *

UNITED STATES PATENT AND TRADEMARK OFFICE
CERTIFICATE OF CORRECTION

PATENT NO. : 6,107,370
DATED : August 22, 2000
INVENTOR(S) : John R. Bowlin

Page 1 of 1

It is certified that error appears in the above-identified patent and that said Letters Patent is hereby corrected as shown below:

Column 1,
Line 56, please delete "ofbeing" and insert -- of being -- therefore.

Column 3,
Line 14, please delete "SM2112" and insert -- SM 2112 -- therefore.

Column 4,
Line 6, please delete the second "XH".

Column 5,
Line 36, please delete "Theological" and insert -- rheological -- in place therefore.

Signed and Sealed this

Sixteenth Day of October, 2001

Attest:

NICHOLAS P. GODICI
Attesting Officer
Acting Director of the United States Patent and Trademark Office